United States Patent Office 3,212,995
Patented Oct. 19, 1965

---

3,212,995
6-AMINOPENICILLANIC ACID PRODUCTION
Hsing T. Huang, Groton, Conn., and Thomas A. Seto, Brooklyn, N.Y., assignors to Chas. Pfizer & Co., Inc., Brooklyn, N.Y., a corporation of Delaware
No Drawing. Filed Sept. 24, 1959, Ser. No. 841,944
6 Claims. (Cl. 195—36)

This invention is concerned with the production of 6-aminopencillanic acid by microbiological means. In particular, it is concerned with the hydrolysis of penicillin by means of fungi or hydrolyzing enzymes elaborated by these fungi to produce 6-aminopenicillanic acid.

It is known to produce 6-aminopenicillanic acid, the valuable intermediate which may be regarded as the parent compound of the various penicillins which differ only in the acyl substituent on its 6-amino group, by synthesis (Sheehan A.C.S. Mfg., Boston, April 1959), and by fermentation of a penicillin producing mold in a suitable nutrient medium particularly in the absence of a side chain precursor. The production of 6-aminopenicillanic acid in this manner points to its formation as an intermediate in the microbiological synthesis of penicillins, as an alternative metabolite or as a product of enzymatic hydrolysis of a penicillin.

Previous evidence for the enzymatic hydrolysis of a penicillin was cited by Sakaguchi et al., J. Agr. Chem. Soc. Japan, 23, 411 (1950), who claim to have found a new enzyme, which they termed penicillin-amidase, in the mycelium of *Penicillium chrysogenum* Q 176 which cleaves N-benzyl-penicillin (pencillin G) into 6-aminopenicillanic acid and phenylacetic acid. Haung et al., in copending United States application, Serial Number 821,679, filed June 22, 1959, and now abandoned, have demonstrated the hydrolysis of 6-aminopenicillanic acid by means of bacteria.

It has now been found possible to hydrolyze penicillin with the hydrolyzing activity of selected strains of microorganisms of the subphylum fungi to produce 6-aminopenicillanic acid. This hydrolyzing activity is referred to here as "penicillin-acylase" activity since it results in elimination of an acyl moiety from a penicillin. The 6-aminopenicillanic produced is highly valuable as an intermediate for the synthesis of new and heretofore unavailable penicillins and penicillins difficult or costly to obtain by presently known methods.

By the term "penicillin" is meant the natural and synthetic, both chemically and biochemically produced, penicillins having the formula:

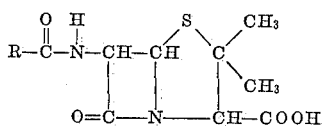

wherein R is selected from the group consisting of saturated and unsaturated alkyl, aryl, aralkyl, heterocyclic, alicyclic and substituted derivatives thereof.

Moreover, the penicillin substrate can also be used in the form of a salt; that is as a basic salt, for example, the sodium, amine, and potassium salt. In general it is preferred to use the alkali metal salts, especially the potassium and sodium salts of the penicillin substrate since they are more readily available and generally more stable than the acid salts.

A variety of fungi have been found to be penicillin-acylase producers. The strains of fungi are selected by testing their ability to hydrolyze benzylpenicillin. Although any penicillin can be used as substrate in the test procedure, the benzylpenicillin sodium or potassium salts are specifically mentioned because of their ready availability. Their utilization as substrates in this process is based only on economic reasons and if, in the future some other penicillin or penicillins become as readily or more readily available as a result of constant developments in the field, they would undoubtedly serve to displace the benzylpenicillin salts from their preferred position.

Preliminary testing of the fungi for penicillin-acylase activity can be carried out by a number of methods to determine whether or not penicillin-acylase activity is present and the approximate relative value of this activity. Since 6-aminopenicillanic acid possesses a much lower order of antibacterial activity than does benzylpenicillin, microbiological assay of the fermentation liquor to determine a decrease in potency is indicative of penicillin-acylase activity. However, since other factors may operate to destroy benzylpenicillin activty, this test is not conclusive. In another modification, which is satisfactory as a screening test, the 6-aminopenicillanic acid on paper chromatograms is detected by conversion to benzylpenicillin followed by plating on agar seeded with *Bacillus subtilis*. The preferred test method involves removal of the benzylpenicillin by solvent extraction, at low pH, of the fermentation liquor followed by treatment of the liquor with phenylacetyl chloride in the presence of a weak base, and microbiological assay, and paper chromatographic identification of the resulting benzylpenicillin. Other acylating agents can, of course, be utilized to convert the 6-aminopenicillanic acid to an active penicillin which is detected by paper chromatography.

More specifically, the preferred test method for selecting a penicillin-acylase producing strain of fungi comprises diluting a culture of the fungi under investigation followed by plating out on a suitable solid nutrient medium and incubation to produce a considerable number of single cell colonies. Individual colonies are then transferred to slants. Each isolate is grown in a suitable medium under submerged conditions in shake flasks. When good growth is obtained, the pH of the culture is adjusted to 7.0 to 8.0, if necessary. Benzylpenicillin (potassium or sodium salt) at a level of 1 to 5 mg./ml. is added and the mixture is shaken in the presence of 1% toluene for from 2–20 hours. The cells are then removed, the clarified broth acidified to a pH value of from about 1 to about 3 with a mineral acid, such as, sulfuric acid, and then extracted with a water immiscible organic solvent to remove benzylpenicillin. Any water immiscible organic solvent is suitable as extracting solvent. However, several water immiscible organic solvents are better than others for reasons of economics and higher solubility of the penicillin G therein. Among these are methyl isobutyl ketone, butyl acetate, diethylether, butanol and chloroform. The extracted broth is then adjusted to about 7 to 9, buffered at this level with, for example, sodium bicarbonate or disodium hydrogen phosphate, and then treated with an excess of an acylating agent, preferably phenylacetyl chloride for periods of from about 10 minutes to about 2 hours at a temperature of from about 0° C. to about 50° C. The benzylpenicillin thus produced is then identified and assayed in accordance with standard practice. The assay value obtained provides a relative measure of the penicillin-acylase producing capacity of a given organism in terms of benzylpenicillin units.

Still another assay for penicillin-acylase activity consists in incubating a sample of the conversion mixture with excess penicillinase for about 15 minutes at 28° C. and then running a paper chromatogram in the system methyl ethyl ketone:acetic acid. Development of the paper chromatogram with ninhydrin gives an intense blue-violet spot due to penicic acid produced by the action of penicillinase on the 6-aminopenicillanic acid.

The fungi which include these penicillin-acylase producing strains are those belonging to the fungi Imperfecti, particularly certain strains of the genus Aspergillus, the genus Beauveria, the genus Scopulariopsis and those belonging to the Phycomycetes, particularly certain strains of the genus Mucor, and the genus Choanephora.

The preferred strains of fungi are selected from the following species; namely: *Aspergillus flavus* Link ATCC 13608, Aspergillus sp. ATCC 13609, *Mucor varians* Pispek ATCC 13610, *Mucor racemosis* ATCC 12166, *Mucor ramannianus* NRRL 1159, Mucor sp. ATCC 13604, Mucor sp. ATCC 13605, Mucor sp. ATCC 13606, Scopulariopsis sp. ATCC 13607, *Choanephora cucurbitarum* ATCC 10909, *Beauveria bassiana* CMI 44229.

For any given species of fungi, it is necessary to select strains which produce penicillin-acylase activity. This invention is not limited to any species of fungi nor does it include every strain of any given species. On the other hand, every strain of fungi yet tried, which produces penicillin-acylase, has been found capable of producing adequate conversion rates of penicillin substrates and satisfactory yields of 6-aminopenicillanic acid.

The choice of culture medium is not a critical factor. In deed, any of the media commonly used for growing microorganisms of the type given above can be employed. However, it should be pointed out that a medium containing naturally occurring materials is preferred over a purely synthetic media because of better growth and rate of penicillin-acylase production. Certain media, of course, are better suited for a particular microorganism than are others for reasons of faster growth and increased rate of penicillin-acylase production. This is determinable by experiment and is illustrated in the examples which follow. It is to be understood that the present invention embraces the use not only of the above described organisms, which are given merely for illustrative purposes; but it also embraces the use of mutants produced from the described organisms by means such as X-ray irradiation, ultraviolet irradiation, treatment with nitrogen mustards and the like. It is to be further understood that the invention includes the use of subcultures obtained by various standard microbiological techniques, such as the single colony and single spore isolation methods. Such mutants and/or subcultures may differ in certain respects from the above described new strains.

The effectiveness of the penicillin-acylase producing microorganisms for the process of this invention may be determined by cultivating the organism in a suitable nutrient medium containing a carbohydrate source such as sugars, starch and glycerol, an organic nitrogen source such as soy bean meal, cotton seed meal, peanut meal, hydrolyzed casein and cornsteep liquor, and mineral salts such as sodium chloride, sodium nitrate, magnesium sulfate and potassium phosphate. In addition to these, a buffering agent, such as calcium carbonate or potassium dihydrogen phosphate, and a foam preventer such as vegetable oils or animal oils may be used. The organism is best grown under submerged conditions of agitation and aeration at temperatures ranging from about 20° C. to about 40° C., but preferably from about 26° C. to about 30° C. The preferred pH range for the growth of the culture is from 6 to 8. During the growth phase, the medium is agitated with stirrers of suitable design for incorporating air into the broth. Aeration at a rate of from about ½ to 2 volumes of air per volume per minute produces satisfactory results. The penicillin compound as a solid, that is, as the amphoteric form or preferably as the sodium or potassium salt, or as a solution in a suitable solvent, for example, water, acetone and lower alkanols such as ethanol, and aqueous mixtures thereof, may be added to the cultivated fungi under sterile conditions and the mixture agitated and aerated in order to bring about hydrolysis of the penicillin substrate. The penicillin may be added when the medium is seeded under sterile conditions with a culture of the microorganism or after growth of the organism is established.

In most cases it has been found advisable to add the penicillin compound after growth of the microorganism has been established in the nutrient medium under aerobic conditions. This is particularly true, if during the initial stages of growth of the fungi, there is a tendency to produce undesired by-products from the penicillin substrate. Best results are obtained when, after growth of the organism is established and substrate added, the conversion mixture is maintained at pH 7.0 to 8.0 and gently agitated. Alternatively, enzyme preparations from the growth of the organism may be used for conducting the process. A further, most useful method is one in which the fungi is grown on a suitable nutrient medium under aerobic conditions in the absence of the penicillin. The mycelia are then collected by centrifugation or by filtration and may, if desired, be washed with distilled water. The mycelia are then suspended in distilled water containing the penicillin substrate. The mixture is agitated and maintained at about pH 7 to 8 for a period of from about 12 to 48 hours after which the products of the reaction are recovered. This process has the advantage of ease of recovery of the penicillin compound, since the various nutrient material originally used to obtain growth of the microorganism is now absent as well as the various material excreted by the growth organism during the initial period. In some cases even better yields are obtained by this method than is the case when the penicillin is added at the beginning or at an intermediate period directly to the whole fermentation broth. Other methods familiar to enzyme chemists may be utilized for conducting the present hydrolysis process. The proportion of products and the rate of hydrolysis as well as the nature of the by-products formed, may vary depending on the use of the whole fermentation broth or of the isolated cells.

In general, a concentration of not greater than one-tenth to five percent of substrate by volume based on the total volume of culture is used in conducting this process, although sometimes other concentration may be found to be more favorably used.

The 6-aminopenicillanic acid can be isolated from the conversion mixtures by various methods. It should be pointed out that the fermentation broths can be used in the dilute form as produced, or in concentrated form. The 6-aminopenicillanic acid can be isolated by ion-exchange techniques using a strong sulfonic acid type resin, such as Dowex–50, Amberlite IR–120; or a strong quaternary type anion exchange resin, such as Dowex–1, Dowex–2, Amberlite IRA–400, Deacidite-FF. Alternatively, it may be acylated with carbobenzoxy chloride, the resulting benzyloxypenicillin extracted with a water immiscible organic solvent and then catalytically reduced to regenerate 6-aminopenicillanic acid as described by Huang in copending patent application Serial Number 803,377, filed April 1, 1959, and now abandoned.

The 6-aminopenicillanic acid can be acylated directly to the desired penicillin without isolation per se by treatment of the conversion mixture in diluted or concentrated form, with the appropriate acylating agent as described above. The penicillin thus produced is isolated by known methods, for example, by extraction into a non-aqueous solvent or by column chromatography.

In the specific examples presented below, emphasis has been placed on the utilization of benzylpenicillin as substrate for the formation of 6-aminopenicillanic acid because of its availability and cost. However, as mentioned above any penicillin can serve as substrate. The choice of the particular penicillin is determined primarily by economic factors. Thus, it is to be understood that the following examples are given solely for purposes of illustration and not of limitation.

Example I

An aqueous medium having the following composition was prepared:

| Ingredients: | Grams/liter |
| --- | --- |
| Peanut meal | 15.0 |
| Sodium sulfate | 1.0 |
| Lactose | 10.0 |
| Cerelose (dextrose hydrate) | 10.0 |
| Corn steep liquor | 5.0 |
| Calcium carbonate | 5.0 |
| Yeast extract | 0.2 |

Adjust to pH 7.0.
Tap water to volume.

100 ml. of this nutrient medium in a 300 ml. flask sterilized in the usual way, was inoculated with a slant culture of *Aspergillus flavus* Link ATCC 13608, and then shaken for 72 hours at 28° C. until good growth was obtained. The pH was then adjusted to 7.0–7.8 with dilute sodium hydroxide, 100 mg. of benzylpenicillin potassium salt, dissolved in pH 7.8 phosphate buffer, and 2 ml. of toluene added and the reaction mixture incubated for 24 hours at 28° C. with shaking. The mixture was periodically assayed for 6-aminopenicillanic acid by paper chromatography using the system toluene; acetone:calcium acetate, 2% aqueous solution, (2:9:1). The benzylpenicillin substrate moves with an $R_f$ value of 0.6 while the 6-aminopenicillanic acid remains at the origin. Spraying of the 6-aminopenicillanic acid spot with 1% sodium bicarbonate followed by 0.2% phenylacetyl chloride in acetone yields benzylpenicillin. The benzylpenicillin thus prepared produces a characteristic zone of inhibition at the origin when the paper chromatogram is bioautographed on an agar plate seeded with *B. subtilis*.

Quantitative determination of the 6-aminopenicillanic acid present was accomplished by conversion to benzylpenicillin and determination of the benzylpenicillin potency by the standard procedure. The broth was filtered, adjusted to pH 2.5–3.0 with dilute hydrochloric acid and extracted with an equal volume of methyl isobutyl ketone (MIK) to remove unconverted benzylpenicillin. The aqueous 6-aminopenicillanic containing phase was raised to pH 7.5 with dilute sodium hydroxide and, to a 10 ml. aliquot, 0.2 g. sodium bicarbonate and 0.2 ml. of phenylacetyl chloride added. After 50 minutes at room temperature with continuous agitation the pH was adjusted to 6.5 and bioassayed for benzylpenicillin.

The 6-aminopenicillanic acid was isolated following filtration and methyl isobutyl ketone extraction of unconverted benzylpenicillin at pH 2.2, by concentration to small volume and precipitation at pH 4.2. The addition of acetone to the concentrate facilitated precipitation.

The use of the sodium salt of benzylpenicillin in place of the potassium salt also gives 6-aminopenicillanic acid.

Example II

The procedure of Example I was repeated using the following medium:

| Ingredient: | Grams/liter |
| --- | --- |
| Corn meal | 12.0 |
| Sodium sulfate | 1.0 |
| Cerelose (dextrose hydrate) | 20.0 |
| Corn steep liquor | 10.0 |
| N.Z. Amine B | 5.0 |
| Yeast extract | 1.0 |
| Calcium carbonate | 5.0 |

Adjust to pH 7.0.
Tap water to volume.

The 6-aminopenicillanic acid was recovered by ion-exchange with Amberlite IR–120 and elution with ammonia.

Example III

Following the procedure of Example I, 6-aminopenicillanic acid was prepared by the replacement of *Aspergillus flavus* Link ATCC 13608, by the following organisms:

Aspergillus sp. ATCC 13609
*Mucor varians* Pispek ATCC 13610
*Mucor racemosis* ATCC 12166
*Mucor ramannianus* NRRL 1159
Mucor sp. ATCC 13604
Mucor sp. ATCC 13605
Mucor sp. 13606
Scopulariopsis sp. ATCC 13607
*Choanephora cucurbitarum* ATCC 10909
*Beauveria bassiana* CMI 44229

Example IV

The procedure of Example I was repeated but using a sterile aqueous medium having the following composition:

| Ingredient: | | |
| --- | --- | --- |
| Soy bean flour | g./l | 20.0 |
| Corn meal | g./l | 10.0 |
| Ferrous sulfate heptahydrate | g./l | 2.5 |
| Magnesium sulfate | mg | 6.25 |

Adjust to pH 6.8.
Tap water to volume.

and the following organisms:

*Aspergillus flavus* Link ATCC 13608
*Mucor racemosis* ATCC 12166
*Choanephora cucurbitarium* ATCC 10909

The 6-aminopenicillanic acid was detected by conversion to benzylpenicillin on paper chromatography and was not isolated.

Example V

Filtered mycelia of *Aspergillus flavus* Link ATCC 13608, grown in the medium of Example I, were resuspended in a volume of water equal to that of the original medium. Benzylpenicillin potassium salt (5 g./l.) and 1% by volume of toluene were added and the mixture shaken and incubated at 28° C. at pH 7.0 to 8.0 until the periodic assays showed good conversion to 6-aminopenicillanic acid. The mixture was then filtered and worked up as in Example I.

Example VI

Following the procedure of Example IV the following penicillins, as their potassium salts, are converted to 6-aminopenicillanic acid:

Phenoxymethylpenicillin
Phenylthiomethylpenicillin
n-Heptylpenicillin
2-thienylmercaptomethylpenicillin
α-Furylmethylpenicillin
2-butenylpenicillin
Chloromethylpenicillin
Allyloxymethylpenicillin
2-cyclopentenylmethyl penicillin

What is claimed is:

1. In a process for the production of 6-aminopenicillanic acid by contacting a penicillin with penicillin-acylase, the improvement which comprises employing penicillin-acylase produced by a strain of fungi selected from the group consisting of *Choanephora cucurbitarium*, *Beauveria bassiana*, Scopulariopsis sp. ATCC 13607 and the genus Mucor.

2. The process of claim 1 wherein the 6-aminopenicillanic acid is recovered.

3. A process according to claim 1 wherein an aqueous penicillin-containing nutrient medium is fermented under submerged aerobic conditions.

4. The process of claim 1 wherein the mycelium is first separated from the broth and the penicillin is then contacted with an aqueous suspension of the mycelium.

5. The process of claim 1 wherein the penicillin is selected from the group consisting of the sodium and potassium salts of benzylpenicillin, phenoxymethylpenicillin, allylmercaptomethylpenicillin, phenylthiomethylpenicillin.

6. The process of claim 1 wherein the pencillin is contacted with a growing culture of a penicillin acylase producing strain of fungi.

References Cited by the Examiner

J. Agr. Chem. Soc., Japan, 23, page 411 (1950).
Nature, vol. 183, pp. 257–258, Jan. 24, 1959.

A. LOUIS MONACELL, *Primary Examiner.*

TOBIAS E. LEVOW, ABRAHAM H. WINKELSTEIN, *Examiners.*